(12) United States Patent
Sama et al.

(10) Patent No.: US 10,893,011 B2
(45) Date of Patent: Jan. 12, 2021

(54) SEMANTIC INTERFACE DEFINITION LANGUAGE FOR ACTION DISCOVERY IN CLOUD SERVICES AND SMART DEVICES

(71) Applicant: Gluru Limited, London (GB)

(72) Inventors: Michele Sama, London (GB); Tim Porter, London (GB); Ozgun Tandiroglu, London (GB); Theodosia Togia, Cambridge (GB); Arseni Anisimovich, London (GB); James Hammerton, London (GB)

(73) Assignee: Gluru Limited

( * ) Notice: Subject to any disclaimer, the term of this patent is extended or adjusted under 35 U.S.C. 154(b) by 167 days.

(21) Appl. No.: 15/703,950

(22) Filed: Sep. 13, 2017

(65) Prior Publication Data

US 2018/0077100 A1   Mar. 15, 2018

Related U.S. Application Data

(60) Provisional application No. 62/393,854, filed on Sep. 13, 2016.

(51) Int. Cl.
| | |
|---|---|
| *H04L 12/58* | (2006.01) |
| *G06Q 10/10* | (2012.01) |
| *G06F 3/16* | (2006.01) |
| *G06F 3/048* | (2013.01) |
| *G06F 9/451* | (2018.01) |
| *G06F 9/54* | (2006.01) |

(52) U.S. Cl.
CPC .............. *H04L 51/18* (2013.01); *G06F 3/048* (2013.01); *G06F 3/167* (2013.01); *G06F 9/453* (2018.02); *G06F 9/54* (2013.01); *G06Q 10/10* (2013.01); *H04L 51/046* (2013.01)

(58) Field of Classification Search
CPC ......... H04L 51/18; H04L 51/046; G06F 9/54; G06F 9/453; G06F 3/167; G06F 3/048; G06F 9/542; G06F 9/546; G06Q 10/10
See application file for complete search history.

(56) References Cited

U.S. PATENT DOCUMENTS

| | | | | |
|---|---|---|---|---|
| 7,228,346 B1* | 6/2007 | Allavarpu | ............... | G06F 9/541 370/360 |
| 7,526,425 B2* | 4/2009 | Marchisio | ........... | G06F 16/3338 704/9 |
| 7,926,029 B1* | 4/2011 | Stoyen | ...................... | G06F 8/20 706/11 |

(Continued)

*Primary Examiner* — Patrice L Winder
*Assistant Examiner* — Angela M Widhalm De Rodrig
(74) *Attorney, Agent, or Firm* — Scheinberg & Associates, PC; John B. Kelly

(57) ABSTRACT

Embodiments of the present invention are directed to computer-implemented methods and systems for representing human or machine-controllable sources, including, but not limited to, cloud services and smart devices, with a Semantic Interface Definition Language (SIDL) so that such resources can be listened to and eventually remote-controlled by discovering and performing Situationally Suitable Actions (SSA). Embodiments of the present invention are further directed to a novel user experience that allows sources to augment each other, removing the need to switch back and forth from different user interfaces (UIs) and overall facilitating or automating the execution of chains of commands.

20 Claims, 11 Drawing Sheets

(56) References Cited

U.S. PATENT DOCUMENTS

| | | | | |
|---|---|---|---|---|
| 8,365,138 B2* | 1/2013 | Iborra | G06F 8/30 | 717/104 |
| 8,442,940 B1* | 5/2013 | Faletti | G06F 17/2785 | 707/610 |
| 8,447,739 B2* | 5/2013 | Naibo | G06Q 10/06 | 707/688 |
| 8,751,930 B2* | 6/2014 | Jhoney | G06F 11/3466 | 709/220 |
| 10,387,784 B2* | 8/2019 | Majumdar | G06F 17/2775 | |
| 10,397,013 B1* | 8/2019 | Hill | H04L 67/306 | |
| 2002/0194388 A1* | 12/2002 | Boloker | G06F 8/38 | 719/310 |
| 2004/0059812 A1* | 3/2004 | Assa | G06F 16/21 | 709/224 |
| 2007/0156669 A1* | 7/2007 | Marchisio | G06F 16/951 | |
| 2009/0160658 A1* | 6/2009 | Armstrong | G06F 17/241 | 340/573.1 |
| 2010/0023482 A1* | 1/2010 | Mershon | G06F 16/748 | 707/E17.014 |
| 2010/0070852 A1* | 3/2010 | Li | G06F 16/958 | 715/239 |
| 2010/0250497 A1* | 9/2010 | Redlich | F41H 13/00 | 707/661 |
| 2011/0173680 A1* | 7/2011 | Bates | G06Q 10/10 | 726/4 |
| 2014/0150022 A1* | 5/2014 | Oh | H04N 21/478 | 725/37 |
| 2016/0073179 A1* | 3/2016 | Havekes | H04N 5/247 | 725/32 |
| 2017/0006135 A1* | 1/2017 | Siebel | G06N 5/003 | |
| 2017/0006141 A1* | 1/2017 | Bhadra | H04W 4/70 | |
| 2017/0161624 A1 | 6/2017 | Porter et al. | | |
| 2020/0210479 A1* | 7/2020 | Bequet | H04L 67/10 | |

* cited by examiner

| Trigger event | Effect on context |
|---|---|
| Confirmation of a hotel reservation. | The user location will be different during the period of the reservation. |
| A scheduled meeting starts. | The user is in a meeting.<br>The meeting is on a certain location.<br>The meeting ends on a certain time. |

FIG. 3

```
{
  "unique_name": "acme_email",
  "readable_name": "ACME Email",
  "feeds": {
    "accept_feedback": true,
    "accept_feedforward": true,
    "allow_feedforward": true
  },
  "discovery": [
    {
      "unique_name": "relevant_search",
      "description": "Search mail threads relevant to a given context",
      "situational_semantic": [
        "information_retrieval",
        "follow_up"
      ],
      "params": [
        {
          "unique_name": "participants",
          "type": "email[]",
          "required": false
        },
        {
          "unique_name": "time_after",
          "type": "time",
          "required": false
        },
        {
          "unique_name": "time_before",
          "type": "time",
          "required": false
        },
        {
          "unique_name": "attachments",
          "type": "regex",
          "required": false
        },
        {
          "unique_name": "text_query",
          "type": "string",
          "required": false
        }
      ]
    },
    {
      "unique_name": "compose",
      "description": "Compose a new mail",
      "situational_semantic": [
        "follow_up",
        "reach_back",
        "answer"
      ]
    }
```

FIG. 9A

```
      "params": [
        {
          "unique_name": "participants",
          "type": "email[]",
          "required": true
        },
        {
          "unique_name": "title",
          "type": "string",
          "required": true
        },
        {
          "unique_name": "attachments",
          "type": "uri",
          "required": false
        },
        {
          "unique_name": "body",
          "type": "string",
          "required": false
        }
      ]
    },
    {
      "unique_name": "attachment_retrieval",
      "description": "Find attachments relevant to a given context",
      "situational_semantic": [
        "information_retrieval",
        "file_sharing"
      ],
      "params": [
        {
          "unique_name": "participants",
          "type": "email[]",
          "required": false
        },
        {
          "unique_name": "time_after",
          "type": "time",
          "required": false
        },
        {
          "unique_name": "time_before",
          "type": "time",
          "required": false
        },
        {
          "unique_name": "attachments",
          "type": "regex",
          "required": false
        },
        {
          "unique_name": "text_query",
          "type": "string",
          "required": false
        }
      ]
    }
  ]
}
```

FIG. 9B

```
[
  {
    "readable_name": "View 'presentation deck.pdf'.",
    "action_uri": "https://gluru.co/api/ssa/c0aa9eef-4bdc-4241-9d4a-29f3960dcfa0",
    "situational_semantic": [
        "read",
        "view"
    ]
  },
  {
    "readable_name": "Share 'presentation deck.pdf' with Bob.",
    "action_uri": "https://gluru.co/api/ssa/6dfaa93c-5352-4f2a-986c-52716fad9c5e",
    "situational_semantic": [
        "share",
        "follow_up"
    ]
  },
  {
    "readable_name": "View 'ACME contract 2016.pdf'.",
    "action_uri": "https://gluru.co/api/ssa/1a3fb1b8-ab2b-4e77-b942-df78535a1592",
    "situational_semantic": [
        "read",
        "view"
    ]
  },
  {
    "readable_name": "Share 'ACME contract 2016.pdf' with Bob.",
    "action_uri": "https://gluru.co/api/ssa/c2471d28-9684-4f5a-aa79-5248037c87cf",
    "situational_semantic": [
        "share",
        "follow_up"
```

FIG. 10

SEMANTIC INTERFACE DEFINITION LANGUAGE FOR ACTION DISCOVERY IN CLOUD SERVICES AND SMART DEVICES

The present patent application claims priority from U.S. Provisional Patent Application No. 62/393,854 filed Sep. 13, 2016, which is hereby incorporated by reference.

TECHNICAL FIELD OF THE INVENTION

Background of the Invention

Network-connected computing devices are commonly used to store and share information quickly and reliably. A user typically receives information from a variety of heterogenous data streams. For example, heterogeneous data streams from which a user may receive information can include email applications, text messaging applications, chat applications, calendaring applications, task managers, to-do lists, project management applications, time trackers, daily planners, and the like. Because the amount of information and the number of data streams are increasing, manually tracking, updating, and completing activities, tasks, intentions, expectations, actions, and triggering events found in the heterogenous data streams is an arduous task for most users. A user must change from one application to another to take action on tasks that are often related. Similar actions often need to be repeated in multiple applications. Taking action on handheld devices is even more difficult because handheld devices have a smaller user interface and a limited ability for a user to interact with more than one application at a time. What is needed is a way to discover actions from a trigger event and augment the user interface of one or more sources with situationally-suitable actions. Further, what is needed semantic interface definition language to facilitate the discovery of actions and facilitate communication between applications.

SUMMARY OF THE INVENTION

Embodiments of the present invention are directed to a computer-implemented method for receiving a message from a source, the source including a semi-structured data stream; determining, based on the content of the message, whether the message includes a trigger event; in response to determining the message includes a trigger event, determining whether an action discovery query (ADQ) includes a parameter that can be bound to a matching parameter in the trigger event; in response to determining the action discovery query includes a parameter that can be bound to a matching parameter in the trigger event, binding the parameter in the trigger event to the matching parameter of the action discovery query; in response to determining the action discovery query does not include a parameter that can be bound to a matching parameter in the trigger event, determining whether the action discovery query includes a parameter that can be bound to a matching parameter in a knowledge base; and in response to determining the action discovery query includes a parameter that can be bound to a matching parameter in a knowledge base, binding the parameter in the trigger event to the matching parameter of the action discovery query.

Other embodiments of the present invention are directed to a computer system comprising a processor; a network adapter coupled to the processor for receiving signals from a third-party system and sending signals to the third-party system; and a computer-readable memory coupled to the processor. The computer-readable memory is programmed with computer-executable instructions that, when executed by the processor, cause the computer system to perform the steps of: receiving a message from a source, the source including a semi-structured data stream; determining, based on the content of the message, whether the message includes a trigger event; in response to determining the message includes a trigger event, determining whether an action discovery query (ADQ) includes a parameter that can be bound to a matching parameter in the trigger event; in response to determining the action discovery query includes a parameter that can be bound to a matching parameter in the trigger event, binding the parameter in the trigger event to the matching parameter of the action discovery query; in response to determining the action discovery query does not include a parameter that can be bound to a matching parameter in the trigger event, determining whether the action discovery query includes a parameter that can be bound to a matching parameter in a knowledge base; and in response to determining the action discovery query includes a parameter that can be bound to a matching parameter in a knowledge base, binding the parameter in the trigger event to the matching parameter of the action discovery query.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 3 is a table showing examples of knowledge inference based on trigger events;

FIG. 9A shows exemplary code for modelling an email service;

FIG. 9B is a continuation of the code in FIG. 9A;

FIG. 10 shows code representing an example response; and

DETAILED DESCRIPTION OF EMBODIMENTS

Figure 1:
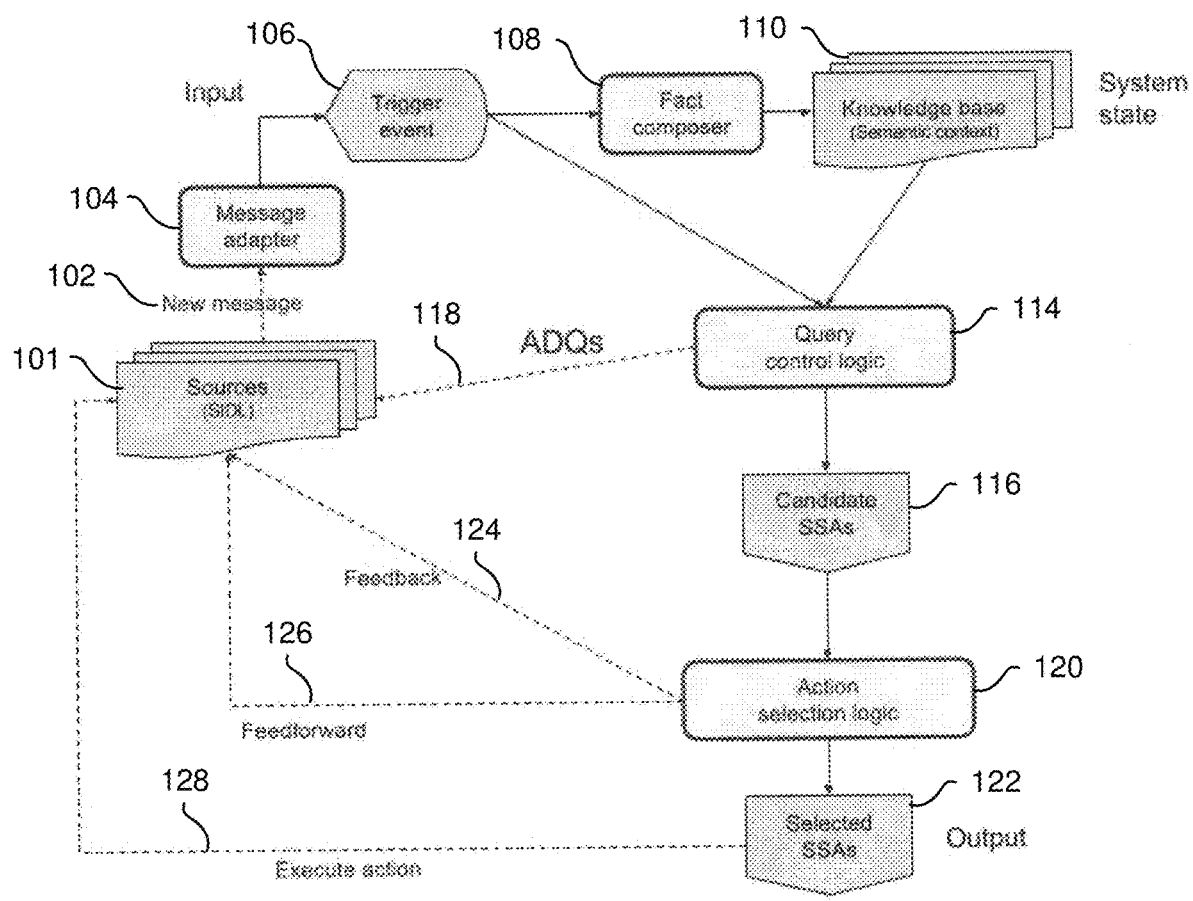
FIG. 1 shows an exemplary data flow diagram in accordance with one or more embodiments of the present invention.

Embodiments of the present invention are directed to computer-implemented methods and systems for representing human or machine-controllable sources, including, but not limited to, cloud services and smart devices, with a Semantic Interface Definition Language (SIDL) so that such resources can be listened to and eventually remote-controlled by discovering and performing Situationally Suitable Actions (SSA). Embodiments of the present invention are further directed to a novel user experience that allows sources to augment each other, removing the need to switch back and forth from different user interfaces (UIs) and overall facilitating or automating the execution of chains of commands. The Gluru application, owned and developed by the applicant of the present application, includes embodiments of the present invention.

Situationally Suitable Actions (SSA) are defined as actions which are plausible and possible within the context of the current situation. Depending on the situation, embodiments of the present invention can discover SSAs from the various connected sources by using Action Discovery Queries (ADQs) as defined in the SIDL description of the source. By receiving messages, called trigger events, from various sources, embodiments of the present invention are able to determine the semantic context in which users are operating and allows sources to provide, on demand, SSAs. This is an advanced form of discovery in which, instead of discovering resources, the system discovers SSAs from connected sources (i.e., cloud services, smart devices, or any other programmable entity). Moreover, as long as a SIDL-compatible semantic interface is provided, embodiments of the present invention allow the system to agnostically hot-plug, listen to, and remotely-control sources without any additional prior knowledge of their purpose.

In order to achieve more complex or domain-specific behaviors, the decision of when to discover SSAs (using ADQs) can also be delegated to an external subsystem acting as the control logic, even though the system could work on its own, simply in a reactive way. The Intentions lifecycle algorithm described in U.S. patent application Ser. No. 15/686,946 can extend embodiments of the present invention by providing predictive control logics. U.S. patent application Ser. No. 15/686,946, filed on Aug. 25, 2017, to Sama et al. and owned by the applicant of the present application is hereby incorporated by reference in its entirety.

For instance, if the user is currently interested in traveling by train, buying a train ticket through his/her connected online booking service is a plausible action, as is printing the obtained ticket on his/her connected smart printer. Within the same context, other actions may be unsuitable. Actions such as accommodation booking are unsuitable because they are not related to the situation. Other actions are unsuitable because the system may not have enough information to discover and invoke the actions.

The system can provide a unique user experience in which messages from a source are augmented with one-click actions from other connected sources and in which fields and values that a user would normally fill manually (e.g. starting point and destination of a desired train trip) are instead extracted and inferred from the context, optionally combined with the current state of knowledge, represented inside a knowledge base. This unique experience enables services and smart devices to contribute to each other, providing a more unified user experience.

Example Use Case 1: Booking a Taxi Home

Consider a user booking a taxi using a connected cloud service. When the booking is completed, the system receives a message containing the description of a reservation with various details including a 4:30 pm estimated time of arrival. By processing the message, the system understands that the user is going home and he or she will reach there at 4:30 p.m. This knowledge can be forwarded to other compatible connected resources. One of such resources is a smart thermostat which defines an interface to receive notifications stating when the user is or will be home. Upon being invoked with a feedforward notification, the thermostat states that the house is quite cold and generates a "turn on the heating at 4:15 p.m." suggested action. The taxi app receives a feedback notification with the suggestion and can tell the user "You will be home at 4:30 p.m. The temperature at home is 15° C. Would you like to turn on the heating at 4:15 pm?" Similarly, because the thermostat had received a feedforward notification, the thermostat can also signal the user with a similar message. The user can then turn on the heating from the taxi app, from the thermostat UI, or directly from the Gluru application. The same use case can be applied to any other driving direction or route planning apps.

Example Use Case 2: Office Smart Printer

Consider a consultancy company having a meeting with a lead client. The meeting organizer has in his/her task tracker a task reminding him/her to prepare a pitch deck and some background material in preparation for the meeting. The company normally prints hard copies for their potential clients. Once the meeting organizer completes the preparation task, the system receives a notification stating that the meeting material is ready. The system has connected a smart printer which can handle notifications, including office documents. Upon being invoked, the printer suggests printing a copy of the material for each attendee of the meeting to the user. In the printer's smart UI, a quick link to these documents appears. In the task tracker, a "print meeting material" quick action is added.

Example Use Case 3: Holiday Booking

Consider a couple of users in which one is suggesting going on holiday to Barcelona. A message "How about going for 3 days in Barcelona on the 23rd of April" is sent. The user receiving the message has a hotel booking and a flight planner source connected. The system processes the message and infers the intention of travelling to Barcelona from the 23rd to the 26th of April. The hotel booking app has a query action defined with a location, a start, and end date. The flight planner source has a query interface with "from" and "to" locations and a departing and returning date. The system converts the message into a query for both systems and both systems return a list of suitable candidates with a deep link for booking.

Trigger Events and Semantic Fields Definition

FIG. 1 shows an exemplary data flow diagram in accordance with one or more embodiments of the present invention. Starting from messages 102 received from heterogeneous data fields, the system processes and structures the context and the semantics of the original message into a trigger event 106. Trigger event 106 is an abstract, heterogeneous representation of the equivalent message 102 from which trigger event 106 has been generated and in which information has been automatically structured and annotated to facilitate processing. Trigger event 106 is used both to update knowledge base 110 of the context in which the user operates as well as to suggest actions. Fact composer 108 updates knowledge base 110 with information from trigger event 106.

Connected sources 101 notify the system by sending a stream of trigger events 106. It is possible to convert events from third party sources that are in a different format into trigger events 106 by defining adapters capable of extracting the semantics and the context, such as message adapter 104. Using machine learning, it is also possible to create general-purpose adapters capable of adapting any third-party structured message into a trigger event. The general purpose adapter understands the semantics of a structured field in the given message and adapts the structured field into a trigger event's field with the same meaning. Natural text fields and unstructured data can also be processed and included in the trigger event 106.

Processing of natural language data requires putting unstructured text into a predefined set of structured fields described in the semantic interface definition language (SIDL). The predefined set of structured fields includes, but is not limited to, the following fields: mentioned entities (persons, locations, businesses, etc.); date and time mentions; contextual queries describing the frame (a brief summary of meaning of the natural language field that can be used as a query to existing general or specific search engines); type of an action required. Extracted action types belong to a described ontology and are used to query all applicable connected devices and systems for suitable actions. Classification of text fragments into action types, which are organized in ontologies, as described, for example, in U.S. patent application Ser. No. 15/686,946 to Sama et al., filed on Aug. 25, 2017, which is co-owned by the application of the present application and hereby incorporated by reference.

Events often also contain attachments or other resources such as reservations, invoices or RSVPs. Such resources can then be used for action discovery, as explained below in a later section. For instance, upon receiving an RSVP a calendar source could be queried for availability. Similarly, upon receiving a file attachment, a reading application could suggest adding the file to a reading list.

Discovering Actions

Semantic interface definition language (SIDL) allows sources to define Action Discovery Queries (ADQs) in order to generate a list of candidate situationally suitable actions (candidate SSAs 116). The semantics of such operations is: "within the frame of the current semantic context, is any action available?" Candidate SSAs 116 and ADQs 118 can be determined by query control logic 114. The system, using action selection logic 120, then shortlists SSAs and selects the subset that will be propagated to the user (selected SSAs 122). The user can then execute an action (execute action 128) within the user interface (UI) of one or more sources 101 (see FIGS. 6-8, described in further detail below).

For instance, given the context of a user being in London but being willing to travel to Barcelona in the future, the connected hotel booking source (sources 101) will receive a request to discover available actions (action discovery query 118) to which it could reply with a "book" action for the most suitable hotels or for the best deals and with a general "search hotels" action. Other connected sources (sources 101), for example a smart printer, will not have any situationally suitable action. Subsequently, after the user has booked a hotel, the smart printer could suggest printing the reservation while the booking service could suggest an action "view/change reservation".

Connected sources can specify multiple discovery operations.

Action selection logic 120 follows the three criteria below:

1. The semantics of the situational context (semantic context) is "compatible" with the semantics of the ADQ 118.
2. The system can find all the parameters required to invoke the ADQ 118.
3. Once invoked, the ADQ 118 has returned at least one action.

Every ADQ 118 matching these criteria can then be shortlisted for augmenting trigger event 106. The system allows a score function to be defined in order to select an action fulfilling a selected goal.

Natural Language as Universal Binder

Traditional discovery for remote procedure call (RPC) assumes strongly typed parameter binding. As mentioned above, the system can work with an implementation of this kind, not only by specifying all the desired parameters in ADQs 118, but also by extracting these parameters from the message 102 and/or from the system's current state of knowledge (knowledge base 110). A description of extracting parameters from message 102 is given in the "Discovering actions" section above. A description of extracting parameters from knowledge base 110 is given in the "Contextual knowledge" section below.

In addition to utilizing traditional parameter binding, the system can communicate with third-party sources using natural language. Modern systems, such as chatbots and voice recognition assistants, use natural language as input and internally process and convert instructions from natural language into operations. Instead of doing parameter binding as described above in "Discovering actions", the system can also use the trigger event 106 and the current state of knowledge (knowledge base 110) to generate a command in natural text and use this command to invoke suitable ADQs 118. For instance, an email from Bob mentioning, "Hey Tom, can you send me the latest offer we made to ACME?" can be processed as the intended action of "retrieving and sharing a file" and a natural language command will be phrased as "Share most recent ACME offer with Bob". A cloud-based file system can then use that command to internally search for the requested file and, once a file is found, to return a "share" one-click action for Tom to select. Converting a task suggestion into natural language instructions can be achieved using Natural Language Generation (NLG), while converting the natural language instructions into actions can be performed by the connected source using Natural Language Understanding (NLU).

Communicating requests to third-party connected sources via natural language has the advantage of using a universally understood semantic interface (e.g., humans can easily communicate intended actions and give instructions to each other using natural language, despite occasional ambiguities, which can be resolved by further communication). Using natural language as a semantic interface can enable sources that do not have a SIDL interface to complete actions.

Contextual Knowledge

The system can work in a completely reactive way by processing messages 102 as they become available and by extracting information as it is contained in the trigger events 106. However, trigger events 106 do not always have enough information to satisfy all the parameters for an ADQ 118. When trigger events 106 do not have enough information to satisfy all the parameters for an ADQ 118, the system can capture contextual knowledge (i.e., facts) about the user and store the contextual knowledge in knowledge base 110 that can be used to facilitate querying.

Figure 2:
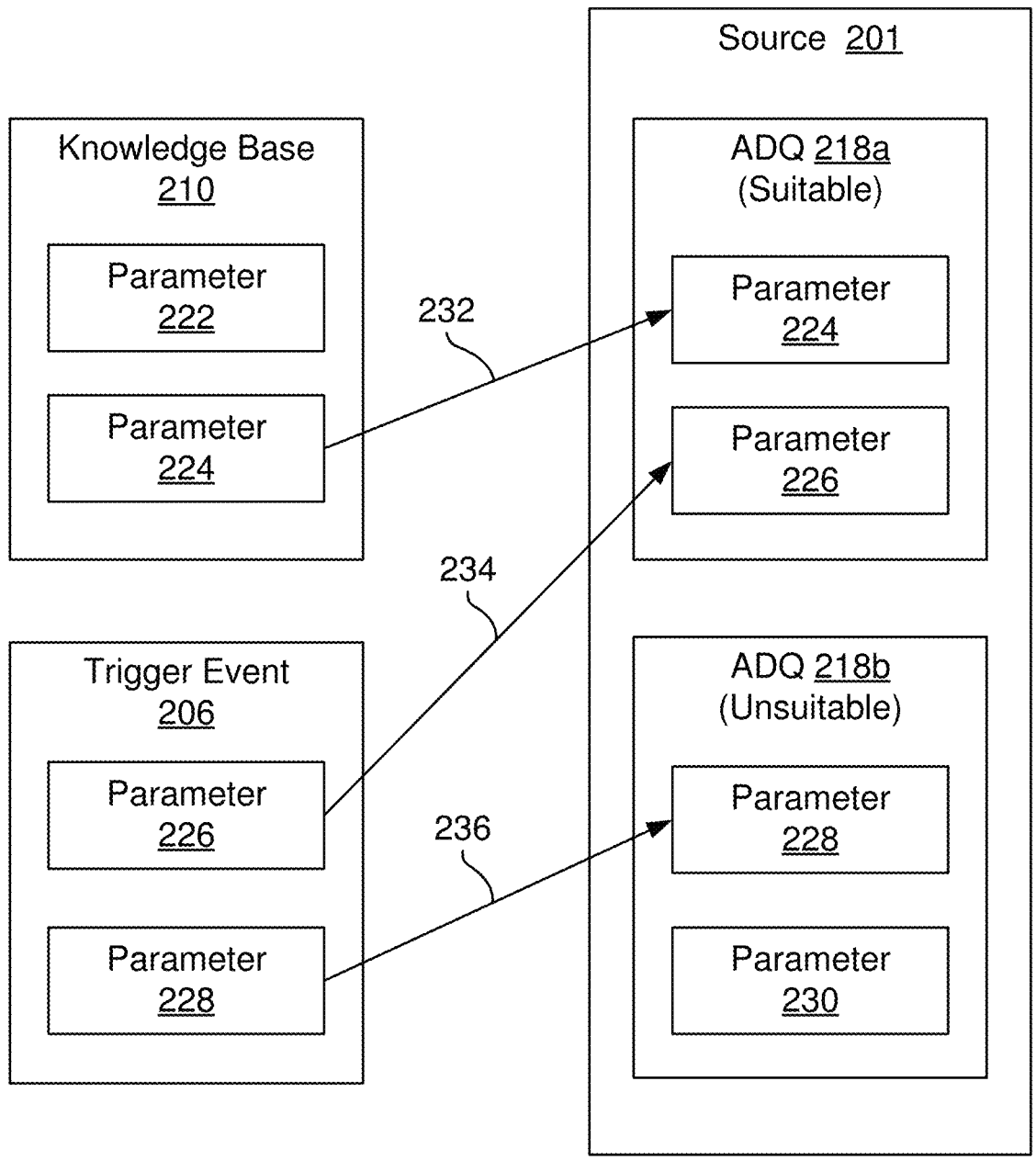
FIG. 2 is a diagram showing an exemplary use of contextual knowledge when trigger events 106 do not have enough information to satisfy all the parameters for an ADQ 118.

FIG. 2 is a diagram showing an exemplary use of contextual knowledge when trigger events do not have enough information to satisfy all the parameters for an ADQ. Trigger event 206 includes parameter 226 and parameter 228. ADQ 218a includes parameter 224 and parameter 226. Because parameter 226 is found in both trigger event 206 and ADQ 218a, the system can bind parameter 226 in trigger event 206 to parameter 226 in ADQ 218a (binding 234). Parameter 224 of ADQ 218a is not included in trigger event 206 and therefore the system cannot bind parameter 224 of ADQ 218a to trigger event 206. However, parameter 224 is stored as contextual knowledge in knowledge base 210. The system can bind parameter 224 of knowledge base 210 to parameter 224 of ADQ 218a (binding 232). Because all parameters of ADQ 218a are bound (either to trigger event 206 or knowledge base 210), ADQ 218a is a suitable ADQ.

ADQ 218b includes parameter 228 and parameter 230. Because parameter 228 is found in both trigger event 206 and ADQ 218b, the system can bind parameter 228 in trigger event 206 to parameter 228 in ADQ 218b (binding 236). Parameter 230 of ADQ 218b is not included in trigger event 206 and therefore the system cannot bind parameter 230 of ADQ 218b to trigger event 206. Parameter 230 is not stored as contextual knowledge in knowledge base 210. The system cannot bind parameter 230 of ADQ 218b to knowledge base 210 or trigger event 206. Because parameter 230 of ADQ 218b remains unbound, ADQ 218a is an unsuitable ADQ.

The system is agnostic to the technology used to implement the knowledge base as long as it would allow extracting parameters usable for querying the ADQs. Examples of possible implementations are a knowledge base and inference engine or a set of key valued properties. FIG. 3 is a table showing examples of knowledge inference based on examples of trigger events. The first exemplary trigger event is the confirmation of a hotel reservation. Because a user typically confirms a hotel reservation prior to staying at the hotel, the effect on context is that the user location will be different during the period of the reservation than the user location at the time the user confirms the reservation. Location information can, for example, be detected from a location-aware device such as a smartphone that is used by the user to confirm the reservation. The second exemplary trigger event is the beginning of a scheduled meeting. The effect on context is that the user is attending a meeting, the meeting takes place at a certain location, and that the meeting ends at a certain time. These are examples of contextual knowledge that can be used in addition to the trigger event itself to satisfy an ADQ.

Competing Resources with Cost and Gain Functions

Given a candidate list of selected ADQs with their respective results (candidate SSAs 116), the system will shortlist them and decide (action selection logic 120) which ADQs, and therefore which actions (selected SSAs 122), to use for augmentation. Examples of possible implementations are cost and gain functions maximizing the number of actions used and, assuming that the UI would allow discarding them, minimizing the number of discarded ones. Such functions can be implemented by recording user actions and ranking the candidate list. For instance, assuming a user connecting two sources in competition (i.e., two sources fulfilling the same purpose, such as two chat applications), both sources will possibly generate the same actions and the system will predict which one the user is most likely to use. Depending on the implementation, the UI could also allow users to see actions from candidate ADQs that weren't shortlisted. That could be achieved with, but not exclusively, a "More actions" button and it would also help to better train the system by collecting information about discarded and user selected suggestions.

Information Feedback on Selected Actions

Figure 4:
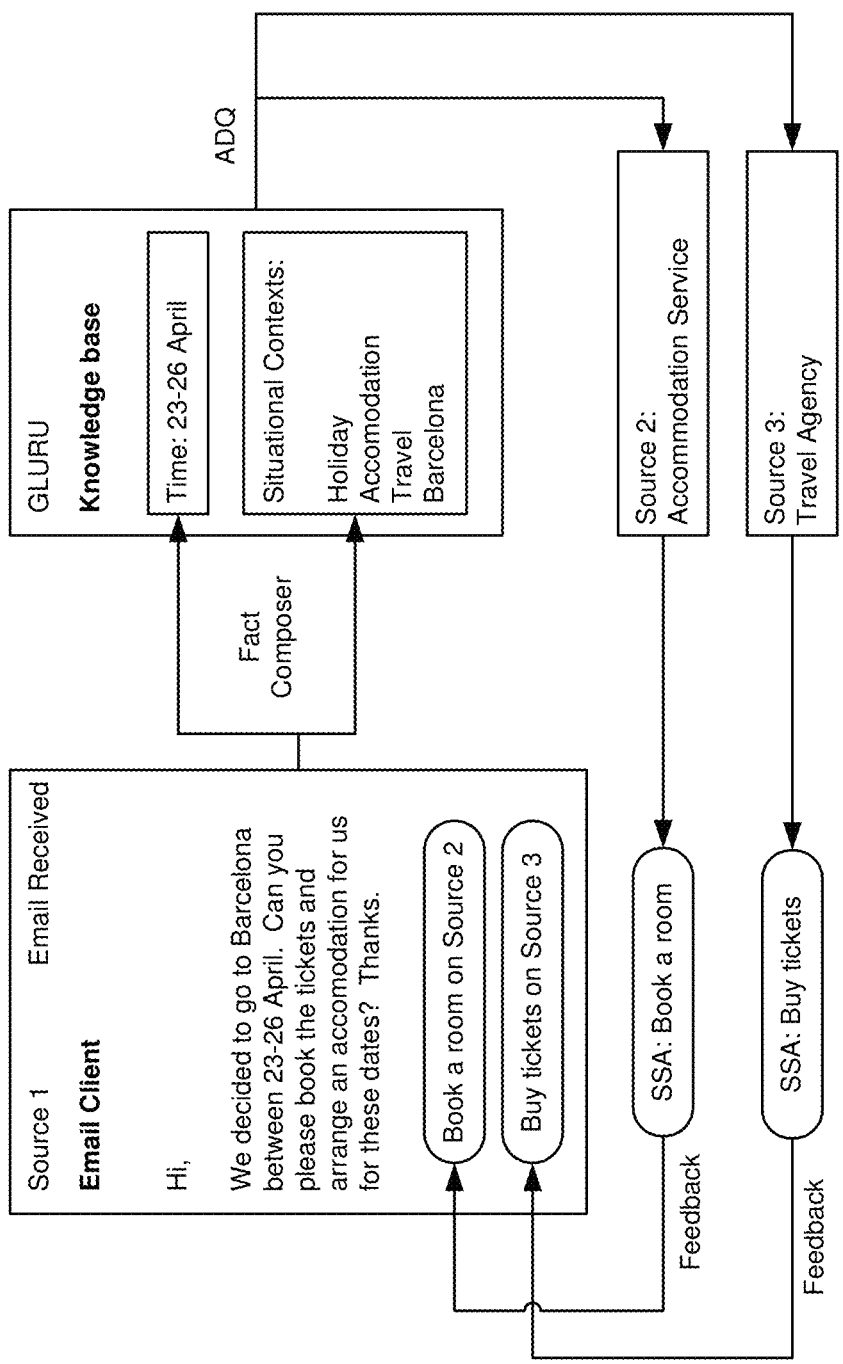
FIG. 4 shows an example of information feedback on selected actions.

Once augmentation actions have been selected (action selection logic 120), the source 101 that has generated the initial trigger event 106 will receive, if specified in the SIDL, a feedback notification 124 with the list of selected actions (selected SSAs 122). This allows the source 101 generating the trigger events 106 to enrich its user experience by suggesting actions or content from third-party sources that are semantically suitable. FIG. 4 shows an example of information feedback on selected actions. A trigger event 106 (in this example, an email) suggesting a vacation is received by a user's email client application (source 1). There are two user connected sources: an accommodation service (source 2) for booking hotel/lodging accommodations, and a travel agency (source 3) for buying airplane tickets. From user connected sources 2 and 3, the system discovers two SSAs: "book a room" and "buy tickets" for a flight. Each of those two actions is suggested by way of feedback to source 1, the email client. The email client can then augment the message displayed to the user with one-click actions: "Book a room on Source 2" and "Buy Tickets on Source 3."

Information Feedforward on Selected Actions

Figure 5:
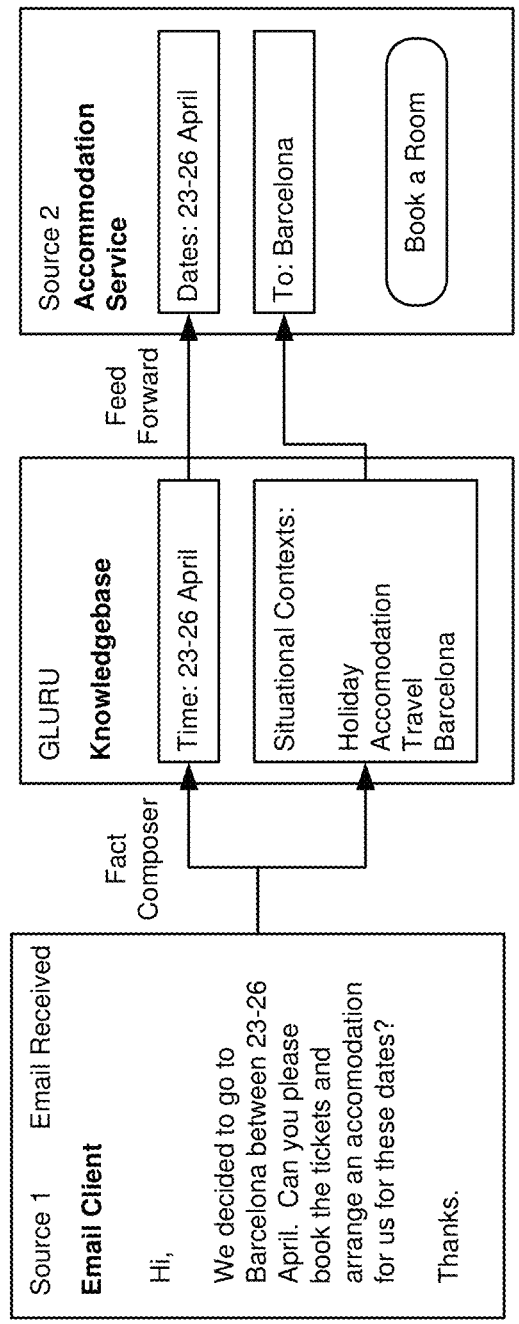
FIG. 5 shows the feedforward mechanism applied to the vacation suggestion example of FIG. 4.

If the SIDL of the source 101 generating a trigger event 106 allows it, sources from which an action has been selected can receive a feedforward notification 126. Sources 101 can specify in their SIDL if they want to receive feedforward notifications 126. A feedforward notification 126 contains the initial trigger event 106 augmented with the action selected from the receiving source. Sources distributing confidential material may decide to disable feedforwarding. Also, only sources whose actions have been selected will receive feedforward notifications. These two measures are in place to control data distribution on a need-to-know basis. FIG. 5 shows the feedforward mechanism applied to the vacation suggestion example of FIG. 4. Once "book a room" is discovered as an SSA, the source providing that action (source 2, the accommodation service) receives a feedforward message with the trigger event. The accommodation service can adapt its UI by adding one-click action buttons or, as shown in FIG. 5, by pre-populating UI elements such as a search form.

Figure 6:
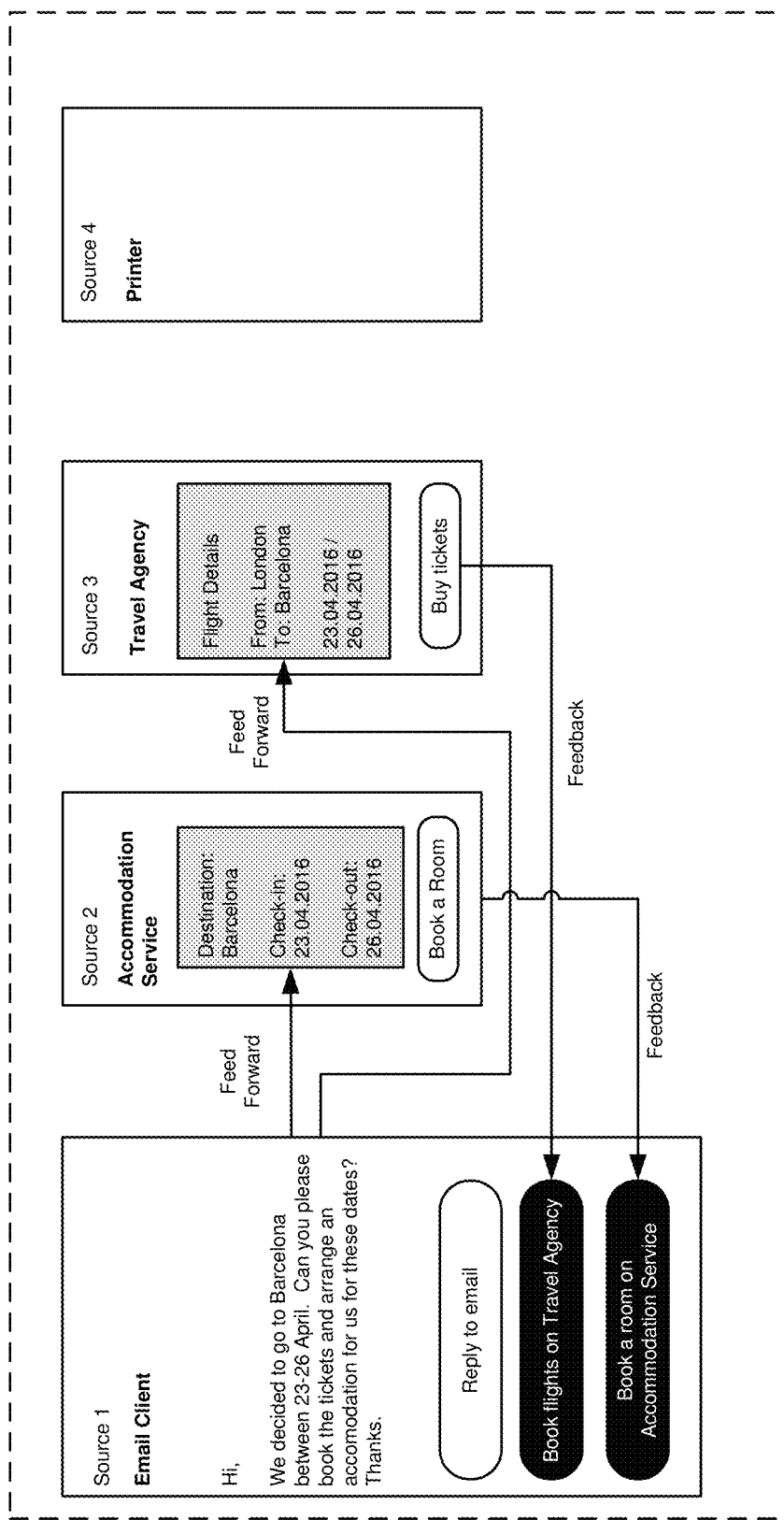
FIG. 6 shows an example of when the first trigger event (i.e., an email) is received.
Figure 7:
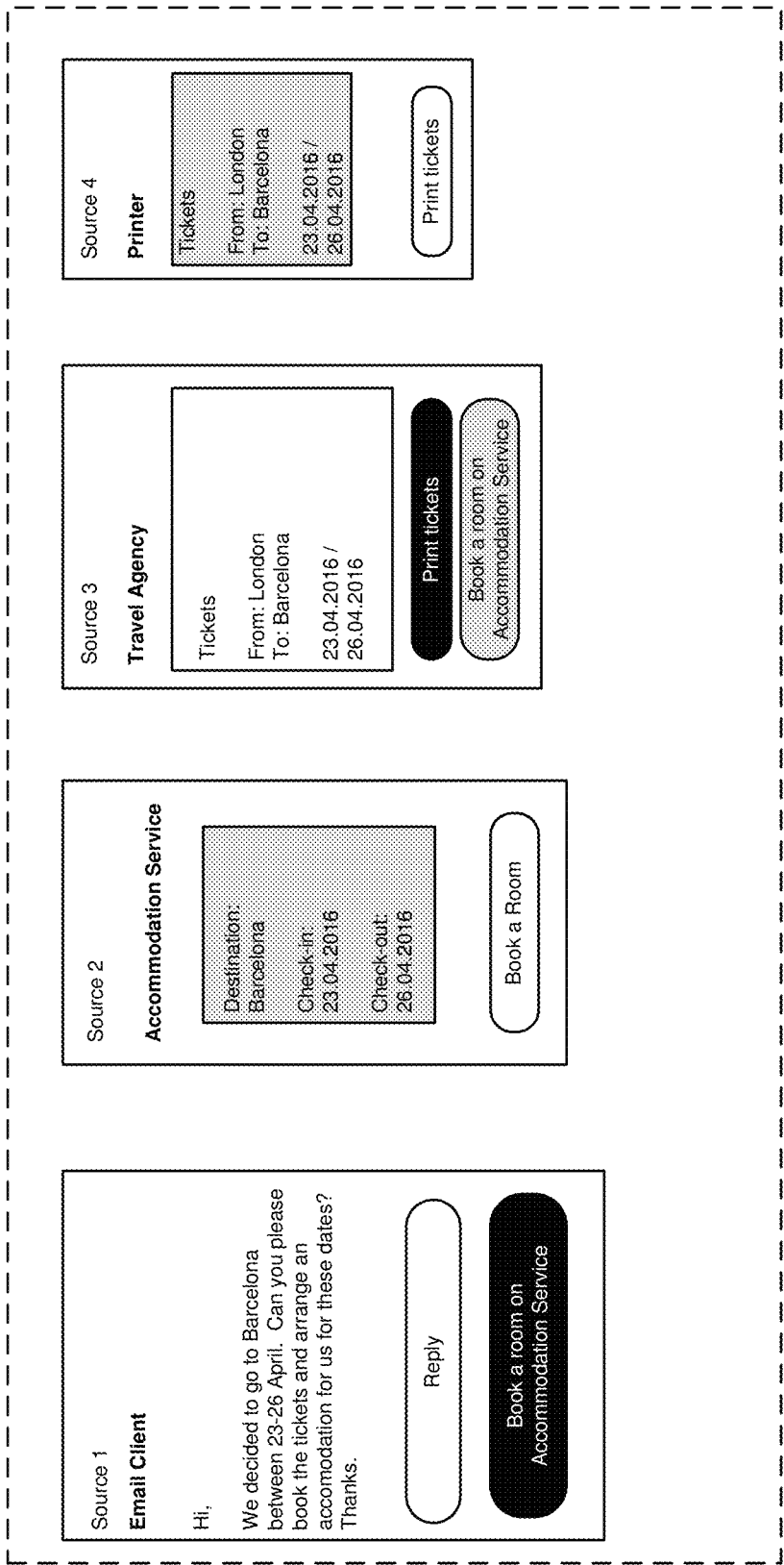
FIG. 7 shows an example of a second trigger event created when the user books a flight.
Figure 8:
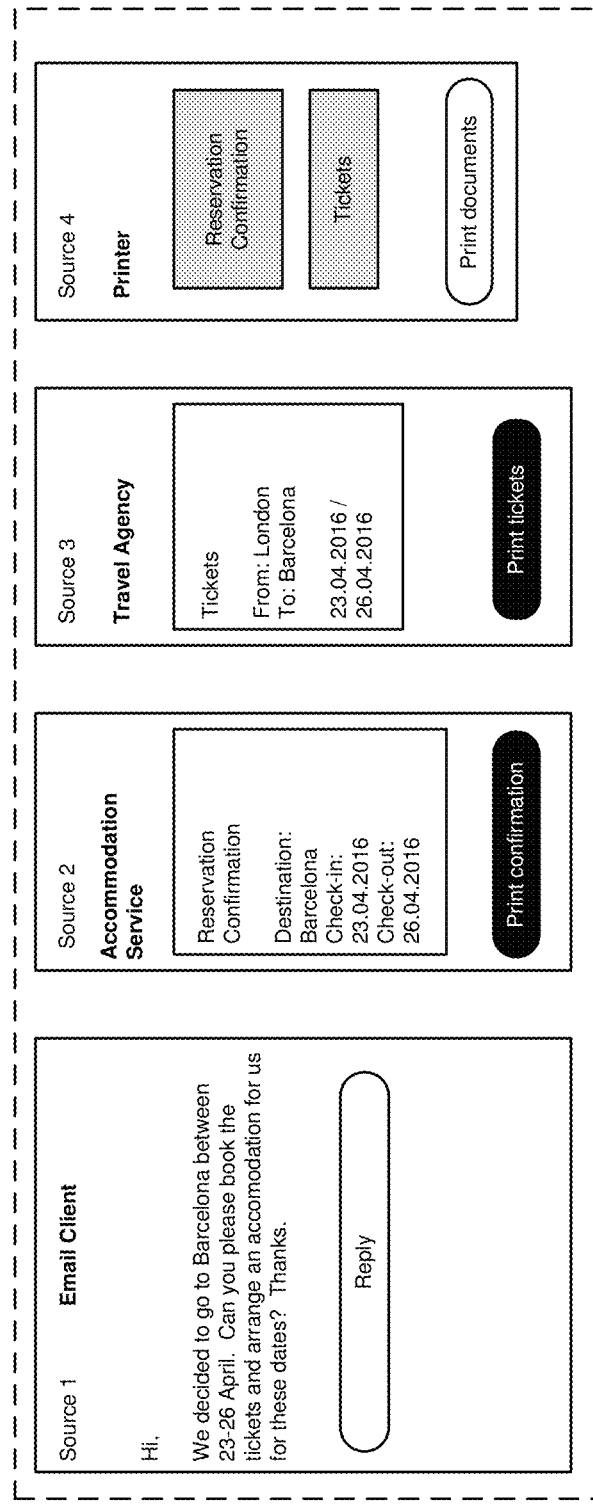
FIG. 8 shows an example of a third trigger event created when the user books a room using the accommodation service.

The feedback and feedforward mechanisms contribute to a user experience beyond that of traditional UIs by unifying all the connected sources in a single global enriched interface. FIGS. 6-8 represent a sequence of two trigger events, an email suggesting a trip and a flight confirmation. FIGS. 6-8 show a possible user experience after both trigger events. This is one of the many possible UI augmentations. The dark gray areas represent UI elements augmented using the feedback mechanism. The light gray areas represent UI elements augmented using the feedforward mechanism. The UI elements with a white background have not been augmented. FIG. 6 shows an example of when the first trigger event (i.e., an email) is received. When the first trigger event (i.e., an email) is received, the email client UI receives a feedback notification suggesting two extra actions: booking a hotel on the accommodation service and booking a flight on the travel agency service. Symmetrically, a connected travel agency service (source 3) and an accommodation service (source 2) each receive a feedforward notification with details about a possible reservation. Those details can both be used to add a one-click action into the UI of source 2 or 3, or to pre-populate existing UI elements such as a search form. The one-click actions for "Book flights on Travel Agency" and "Book a room on Accommodation Service" are augmented using the feedback mechanism. The destination information in source 2 and the flight details in source 3 are UI elements augmented using the feedforward mechanism.

In this example, the user will progress in this workflow and book a flight. The user can book a flight by selecting the "Book flights on Travel Agency" one-click action in source 1 (i.e., directly in the email message) or by selecting the "Buy tickets" button in source 3 (i.e, the travel agency service), as shown in FIG. 6. FIG. 7 shows an example of a second trigger event created when the user books a flight. When the user books a flight, a new trigger event will be processed (i.e. a booking confirmation). The travel agency will then receive a feedback notification suggesting that the user should print his/her recently purchased ticket using his/her local smart printer ("print tickets"). Symmetrically, the smart printer receives a feedforward notification with the details of the tickets to print. The workflow can continue by chaining suggestions and by adapting according to what action the user performs. The message display in the email client can be updated to remove the one-click action for "Book flights on Travel Agency" because the flights have been booked. The accommodation service can still suggest booking accommodation aligned with the dates of the reservation. The user can then book a room using the accommodation service by selecting "Book a room on Accommodation Service" in source 1 (the email client), by selecting "Book a room" in source 2 (the accommodation service), or by selecting "Book a room on Accommodation Service" in source 3 (the travel agency service).

FIG. 8 shows an example of a third trigger event created when the user books a room using the accommodation service. If the user also books a room accommodation, the smart printer can then suggest printing both the reservation confirmation and the tickets for the flight. The message display in the email client can be updated to remove the one-click action for "Book a room on accommodation service" because the rooms have been booked. Source 2 (the accommodation service) can be augmented with a one-click action to display "Print confirmation". Source 3 (the travel agency) can be augmented with a one-click action to display "Print tickets".

Performing Actions

The system allows actions to be shared across relevant sources so that users can interact with them within the app that they are using. To perform an action, the request needs to be routed to the source offering it. Actions often require credentials and permissions that are not shared across sources. The system is capable of handling actions requests with an application programming interface (API) which internally accesses the right credentials and contacts the source acting as provider. That is implemented by binding SSAs with the source generating them and by maintaining valid credentials for each source.

An Example of SIDL

FIG. 9A shows exemplary code for modelling an email service. FIG. 9B is a continuation of the code in FIG. 9A. The email service supports both feedforward and feedback as well as allowing feedforwarding to third parties. Also, the service offers discovery for three types of actions: one for searching existing emails, one for composing and one for searching for files. For example, a user may be asked to share a certain file which had been previously attached to an email. Querying_relevant search will return the action to view and eventually forward the existing conversation containing the bespoke attachment. Similarly querying attachment_retrieval will return the action to open or share that file if found. FIG. 10 shows code representing an example response. The action_uri represents immutable identifiers that the system has generated and is storing internally. Sources with the right credentials can invoke a certain action by knowing its URI and by asking the invention to perform the action with that URI. The selection logic may decide that the user is more keen to share the file directly rather than to view it and may prioritize the share actions.

Messages received from third-party semi-structured data streams can be converted into a collection of semantically-annotated structured fields. Contextual information obtained or inferred from messages can be used to refine the semantically-annotated structured fields. The collection of semantically-annotated structured fields is machine-readable and can be directly used to accomplish various tasks including, but not limited to, automation, recommendation, and augmentation. Situationally-suitable actions from third-party cloud services and smart devices can be discovered by querying semantically defined discovery methods. Semantically-annotated structured fields received from a source can be directly applied to control the same or other sources through actions obtained by querying the situationally-suitable actions. Semantically-annotated structured fields received from a source can be processed and used to automatically control or predict future actions obtained by querying the situationally-suitable actions. Services and devices for which the input is known, such as messages received from third-party semi-structured data streams, and actions that are situationally discovered can be hot-plugged without any additional prior knowledge of what their purpose is. Hot plugged resources can be used as data sources for semantically-annotated structured fields. Hot plugged resources can provide situationally-suitable actions. Resources, such as attachments or identifiers of external entities such as store items contained in messages received from third-party semi-structured data streams or generated by situationally-suitable actions from third-party cloud services and smart devices, can also be semantically annotated and contribute to the contextual information obtained or inferred from messages used to refine the semantically-annotated structured fields. Where multiple actions fulfil the same purpose, it is possible to apply cost and gain functions to optimize a user given objective. Resources providing a message resulting in actions being applied or predicted can receive a feedback notification of such command allowing them to augment their user interface (UI) or improve their behavior. Resources providing actions being applied or predicted as a result of a message can receive a feedforward notification of such a message, allowing them to augment their UI or improve their behavior. Natural language can be used to generate commands to control chat bots or voice recognition powered systems.

Hardware Environment

Figure 11:
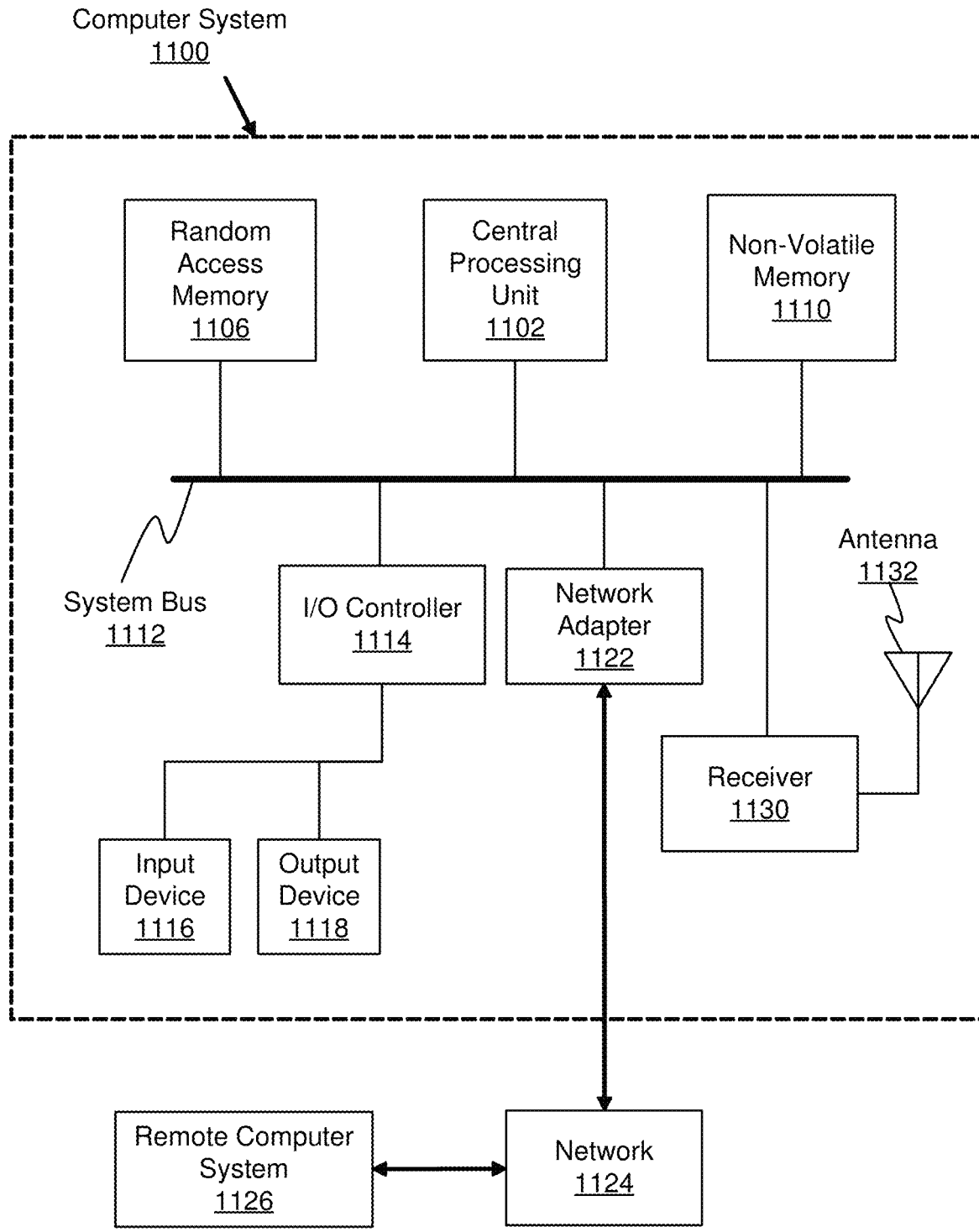
FIG. 11 shows a block diagram of a computer system suitable for storing and/or executing a computer program in accordance with embodiments of the present invention.

At least one embodiment of the present invention is directed to a computer program encoded in a computer-readable memory. The computer program comprises computer-executable instructions that, when executed, causes one or more computer systems to perform embodiments of the present invention described herein. The term "computer system" as used herein refers to any data processing system or computer system including, but not limited to, personal computers (PC), file servers, cloud computing systems, software-as-a-service (SaaS) systems, cellular telephones, smartphones, tablet devices, laptop computers, personal digital assistants, and the like. FIG. 11 is a block diagram showing a computer system 1100 suitable for storing and/or executing a computer program in accordance with embodiments of the present invention. Computer system 1100 includes a central processing unit 1102 having at least one microprocessor. Central processing unit 1102 can be coupled directly or indirectly to memory elements through system bus 1112. The memory elements comprise computer-readable memory capable of storing computer-executable instructions. The memory elements can include random access memory 1106 employed during the actual execution of the program code and non-volatile memory 1110 for longer term storage of data and instructions. One or more input devices 1116 and output devices 1118 can be coupled to system bus 1112 either directly or through an intervening I/O controller 1114. Examples of input device 1116 include, but are not limited to, a pointing device, such as a mouse or a trackpad, or a keyboard. Examples of output device 1118 include, but are not limited to, a display screen or a printer. Input device 1116 and output device 1118 can be combined into a single device, for example, as a touchscreen comprising a display screen (for displaying output to the user of computer system 1100) having a touch-sensitive surface (for receiving input from the user of computer system 1100). One or more network adapters 1122 may also be coupled to computer system 1100 to enable the system to become communicatively coupled to remote computer system 1126 or remote printers or storage devices through intervening private or public networks 1124. Modems, cable modems, Ethernet cards, and wireless network adapters are just a few of the currently available types of network adapters. Computer system 1100 can include one or more receivers 1130. Receiver 1130 receives wireless signals via antenna 1132. Receiver 1130 is adapted for receiving a data signal from a transmitting device. Receiver 1130 can comprise a transceiver capable of both transmitting and receiving wireless data signals, including but not limited to, wireless local area networking, Wi-Fi, Bluetooth, cellular radio signals (GSM, CDMA, UMTS, LTE, etc.), global positioning system (GPS) signals, near field communication (NFC) signals, and the like. While various component devices of computer system 1100 are shown as separate component devices in FIG. 11 for purposes of description, the various component devices may be integrated into a single device, as is known in the art, such as a system-on-a-chip (SoC) device.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps:

We claim as follows:

1. A computer-implemented method comprising:
receiving a message from a first source among a plurality of sources, each of the plurality of sources defining one or more action discovery queries according to a semantic interface definition language;
processing the message into a predefined set of structured fields according to the semantic interface definition language;
generating a trigger event from the message, the trigger event having one or more parameters defined by the semantic interface definition language;
determining whether an action discovery query (ADQ) in the set of action discovery queries associated with the plurality of sources includes a parameter that can be bound to a matching parameter in the trigger event based on the predefined set of structured fields of the semantic interface definition language;
in response to determining the action discovery query includes a parameter that can be bound to a matching parameter in the trigger event, binding the parameter in the trigger event to the matching parameter of the action discovery query;
in response to determining the action discovery query includes a parameter that cannot be bound to a matching parameter in the trigger event, determining whether the parameter that cannot be bound to a matching parameter in the trigger event can be bound to a matching parameter in a knowledge base; and
in response to determining the parameter that cannot be bound to a matching parameter in the trigger event can be bound to a matching parameter in a knowledge base, binding the parameter in the knowledge base to the matching parameter of the action discovery query.

2. The method of claim 1, further comprising:
determining whether each of the parameters of the action discovery query are bound to a matching parameter in the trigger event or the knowledge base;
in response to determining each of the parameters of the action discovery query are bound to a matching parameter in the trigger event or the knowledge base:
creating a set of candidate situationally-suitable actions (SSAs); and
invoking the action discovery query at the source of the trigger event.

3. The method of claim 2, further comprising:
determining whether the action discovery query at the source of the trigger event returned at least one situationally-suitable action; and
in response to determining the action discovery query at the source of the trigger event returned at least one situationally-suitable action, creating a set of selected situationally-suitable actions from the at least one at least one situationally-suitable action.

4. The method of claim 3, further comprising augmenting the trigger event with the at least one situationally-suitable action.

5. The method of claim 1, further comprising discovering a situationally suitable action (SSA) by querying the semantically annotated structured fields.

6. The method of claim 5, further comprising controlling a source of a semi-structured data stream using the situationally suitable action and the semantically annotated structured fields.

7. The method of claim 5, further comprising processing the semantically annotated structured fields to automatically predict a second situationally suitable action.

8. The method of claim 1, in which a second semi-structured data stream is added while the method is executing.

9. The method of claim 8, in which the second semi-structured data stream can be used as a data source.

10. A computer system comprising:
a processor;
a network adapter coupled to the processor for receiving signals from a third-party system and sending signals to the third-party system;
a computer-readable memory coupled to the processor, the computer-readable memory programmed with computer-executable instructions that, when executed by the processor, cause the computer system to perform the steps of:
receiving a message from a first source, among a plurality of sources, each of the plurality of sources defining one or more action discovery queries according to a semantic interface definition language;
processing the message into a predefined set of structured fields according to the semantic interface definition language;
generating a trigger event from the message, the trigger event having one or more parameters defined by the semantic interface definition language;
determining whether an action discovery query (ADQ) in the set of action discovery queries associated with the plurality of sources includes a parameter that can be bound to a matching parameter in the trigger event based on the predefined set of structured fields of the semantic interface definition language;
in response to determining the action discovery query includes a parameter that can be bound to a matching parameter in the trigger event, binding the parameter in the trigger event to the matching parameter of the action discovery query;
in response to determining the action discovery query includes a parameter that cannot be bound to a matching parameter in the trigger event, determining whether the parameter that cannot be bound to a matching parameter in the trigger event can be bound to a matching parameter in a knowledge base; and
in response to determining the parameter that cannot be bound to a matching parameter in the trigger event can be bound to a matching parameter in a knowledge base, binding the parameter in the knowledge base to the matching parameter of the action discovery query.

11. The computer system of claim 10, further programmed to perform the steps of:
determining whether each of the parameters of the action discovery query are bound to a matching parameter in the trigger event or the knowledge base;
in response to determining each of the parameters of the action discovery query are bound to a matching parameter in the trigger event or the knowledge base:
creating a set of candidate situationally-suitable actions (SSAs); and
invoking the action discovery query at the source of the trigger event.

12. The computer system of claim 11, further programmed to perform the steps of:
determining whether the action discovery query at the source of the trigger event returned at least one situationally-suitable action; and
in response to determining the action discovery query at the source of the trigger event returned at least one situationally-suitable action, creating a set of selected situationally-suitable actions from the at least one at least one situationally-suitable action.

13. The computer system of claim 12, further programmed to perform the step of augmenting the trigger event with the at least one situationally-suitable action.

14. The computer system of claim 10, further programmed to perform the step of discovering a situationally suitable action (SSA) by querying the semantically annotated structured fields.

15. The computer system of claim 14, further programmed to perform the step of controlling a source of a semi-structured data stream using the situationally suitable action and the semantically annotated structured fields.

16. The computer system of claim 14, further programmed to perform the step of processing the semantically annotated structured fields to automatically predict a second situationally suitable action.

17. The computer system of claim 10, in which a second semi-structured data stream is added while the method is executing.

18. The computer system of claim 17, in which the second semi-structured data stream can be used as a data source.

19. The method of claim 1, in which the trigger event is used to update the knowledge base of the context in which the user operates.

20. The computer system of claim 10, in which the trigger event is used to update the knowledge base of the context in which the user operates.

* * * * *